United States Patent
Kim et al.

(10) Patent No.: US 8,607,902 B2
(45) Date of Patent: Dec. 17, 2013

(54) WIDTH VARIABLE STRUCTURE OF MOVING AND TRANSPORT MEANS USING MECANUM WHEELS

(75) Inventors: Cheol Han Kim, Yongin (KR); Hee Tae Yang, Hwaseong-Gyeonggi-Do (KR); Seong Ki Ha, Busan (KR); Hee Chan Kim, Seoul (KR); Dae Yub You, Hwaseong (KR); Wan Lee, Wanju (KR); Sang Hyun Han, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 13/316,012

(22) Filed: Dec. 9, 2011

(65) Prior Publication Data

US 2013/0068543 A1 Mar. 21, 2013

(30) Foreign Application Priority Data

Sep. 21, 2011 (KR) ........................ 10-2011-0095411

(51) Int. Cl.
*B62D 11/00* (2006.01)
*B62D 21/14* (2006.01)
*B62D 57/00* (2006.01)

(52) U.S. Cl.
USPC .............. 180/6.5; 180/7.1; 180/7.2; 180/209; 180/252; 280/43.16

(58) Field of Classification Search
USPC .......... 180/6.48, 6.5, 7.1, 7.2, 21, 43.16, 209, 180/252; 280/43.16
See application file for complete search history.

(56) References Cited

U.S. PATENT DOCUMENTS

| | | | | |
|---|---|---|---|---|
| 4,223,753 A | * | 9/1980 | Bradbury | 180/6.2 |
| 5,701,966 A | * | 12/1997 | Amico | 180/7.2 |
| 6,477,730 B1 | * | 11/2002 | Marrero | 15/53.1 |
| 6,668,950 B2 | * | 12/2003 | Park | 180/7.1 |
| 7,575,076 B2 | | 8/2009 | Kang et al. | |
| 7,980,335 B2 | * | 7/2011 | Potter | 180/7.1 |
| 2003/0066693 A1 | * | 4/2003 | Marrero | 180/21 |
| 2005/0183896 A1 | * | 8/2005 | Fenelli et al. | 180/65.3 |
| 2008/0087484 A1 | | 4/2008 | Fenelli et al. | |
| 2008/0185222 A1 | * | 8/2008 | Herrmann et al. | 182/69.4 |

FOREIGN PATENT DOCUMENTS

| | | |
|---|---|---|
| JP | 08-040275 A | 2/1996 |
| JP | 2006-051838 A | 2/2006 |
| JP | 2010-076630 | 4/2010 |
| JP | 2010-264845 | 11/2010 |
| KR | 1020030044193 | 6/2003 |
| KR | 101012719 | 2/2011 |
| KR | 1020110064826 | 6/2011 |
| KR | 1020110078314 | 7/2011 |

* cited by examiner

*Primary Examiner* — Kevin Hurley
*Assistant Examiner* — Marc A Scharich
(74) *Attorney, Agent, or Firm* — Edwards Wildman Palmer LLP; Peter F. Corless

(57) ABSTRACT

A width variable structure using mecanum wheels is provided, which includes a plurality of mecanum wheels, a plurality of links connecting the mecanum wheels, and motors mounted on the mecanum wheels to transfer driving forces to the links, respectively. Since the width of the structure in the horizontal and vertical directions can be adjusted using the driving forces of the mecanum wheels, components such as actuators are omitted in the overall assembly.

6 Claims, 5 Drawing Sheets

(a)

(b)

(c)

(d)

(e)

<Prior Art>

(a)

(b)

(a)

(b)

WIDTH VARIABLE STRUCTURE OF MOVING AND TRANSPORT MEANS USING MECANUM WHEELS

CROSS-REFERENCE TO RELATED APPLICATION

This application is based on and claims priority from Korean Patent Application No. 10-2011-0095411, filed on Sep. 21, 2011 in the Korean Intellectual Property Office, the disclosure of which is incorporated herein in its entirety by reference.

BACKGROUND OF THE INVENTION

1. Field of the Invention

The present invention relates to a width variable structure of a moving and transport means using mecanum wheels, and more particularly, to a width variable structure of a moving and transport means using mecanum wheels, which can adjust the width of the moving and transport means in horizontal and vertical directions using four wheels.

2. Description of the Prior Art

A mecanum wheel is a wheel that moves in a diagonal direction rather than a rotating direction when idle rollers are slantingly mounted on the all the wheels. FIGS. 1A to 1E, illustrate a conventional moving and transport means using mecanum wheels. In particular, idle rollers are coupled to the rotating mecanum wheels, and when the mecanum wheels are rotated, the moving direction of the moving and transport means becomes a diagonal direction as indicated by an arrow.

In this case, if the mecanum wheels are connected, the object moves in a direction that corresponds to a sum vector in a diagonal direction of the respective mecanum wheels. That is, by mounting the mecanum wheels in different slanting directions to face each other and rotating all the mecanum wheels in one direction, the object moves forward.

FIG. 1A illustrates the driving principle of mecanum wheels in which the moving and transport means configured to move forward and backward, and FIG. 1B illustrates the driving principle of mecanum wheels in which the moving and transport means configured to move left and right. FIG. 1C illustrates the driving principle of mecanum wheels in which the moving and transport means configured to move in forward left and forward right diagonal directions, and FIG. 1D illustrates the driving principle of mecanum wheels in which the moving and transport means configured to move backwards left and backwards right diagonal directions. On the other hand, FIG. 1E illustrates the driving principle of mecanum wheels in which the moving and transport means configured to move clockwise or counterclockwise.

As illustrated in FIG. 2, a width variable structure of a moving and transport means using mecanum wheels in the related art varies the width in the vertical direction of the moving and transport means using the mecanum wheels. In the above-described width variable structure, mecanum wheels 10 and 11, provided on the forward left and right sides, are connected through a forward link 21, the mecanum wheels 12, and 13 provided on the back left and right sides are connected through a backward link 22, and an actuator 30 for driving the forward link 21 and the backward link 22 is additionally provided.

As described above, in the related art, since the width of the moving and transport means can be varied only through the actuator 30, the manufacturing cost and the weight of the moving and transport means are increased due to the increase of the constituent components to degrade the merchantability.

Further, since the variable width of the moving and transport means can be adjusted only in the vertical direction, the technique is limited.

SUMMARY OF THE INVENTION

Accordingly, the present invention has been made to solve the above-mentioned problems occurring in the related art while advantages achieved by the related art are maintained intact. Advantageously the present invention is to provide a width variable structure of a moving and transport means, e.g., a vehicle, equipped with mecanum wheels, adjusts the width of the moving and transport means in horizontal and vertical directions using four wheels.

In one aspect of the present invention, there is provided a width variable structure of a moving and transport means using mecanum wheels, which includes a plurality of mecanum wheels; a plurality of links connecting the mecanum wheels; and motors mounted on the mecanum wheels to transfer driving forces to the links, respectively.

Illustratively, the mecanum wheels may include a first mecanum wheel positioned on a front left side; a second mecanum wheel positioned on a front right side; a third mecanum wheel positioned on a rear left side; and a fourth mecanum wheel positioned on a rear right side. Further, it is preferable that the plurality of motors include a first motor mounted on the first mecanum wheel; a second motor mounted on the second mecanum wheel; a third motor mounted on the third mecanum wheel; and a fourth motor mounted on the fourth mecanum wheel.

Further, it is preferable that the links include a first link connected to the first motor; a second link connected to the second motor; a third link connected to the third motor; and a fourth link connected to the fourth motor. A linkage for connecting the first link, the second link, the third link, and the fourth link may be additionally provided. It is also preferable that the linkage is foldably connected to the first link, the second link, the third link, and the fourth link.

As described above, according to the present invention, since the width of the moving and transport means in the horizontal and vertical directions is adjusted using driving forces from the mecanum wheels, components such as actuators may be omitted. Thus, the manufacturing cost can be reduced and the merchantability and effectiveness of the moving and transport means by structural simplification.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 3:
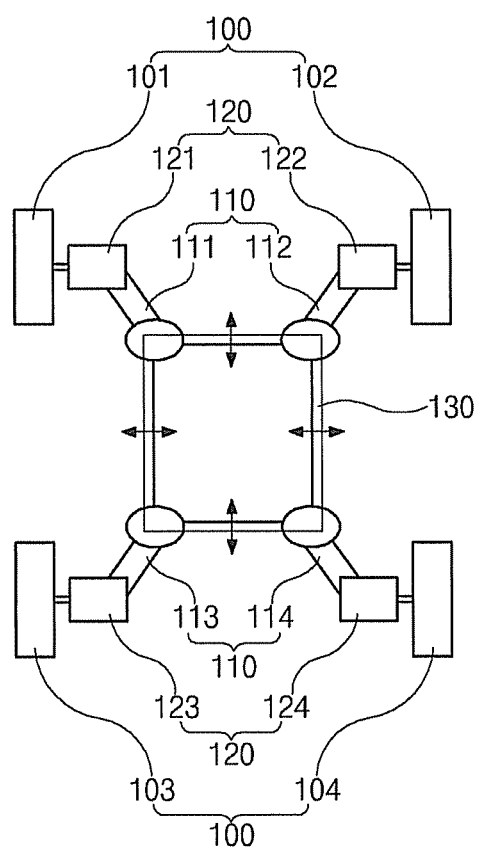
FIG. 3 is a cross-sectional view illustrating a width variable structure of a moving and transport means using mecanum wheels according to an exemplary embodiment of the present invention.
Figure 4:
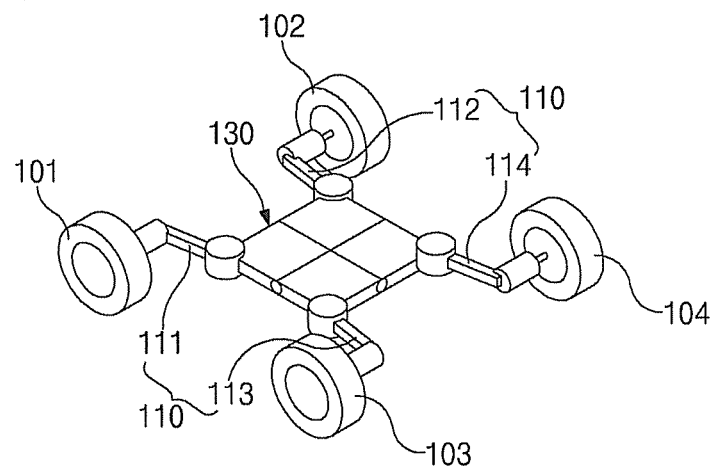
FIG. 4A is a view illustrating a width variable structure of a moving and transport means using mecanum wheels in a state before the width is changed in the vertical direction according to an exemplary embodiment of the present invention.
FIG. 4B is a view illustrating a width variable structure of a moving and transport means using mecanum wheels in a state after the width is changed in the vertical direction according to an exemplary embodiment of the present invention.
Figure 4:
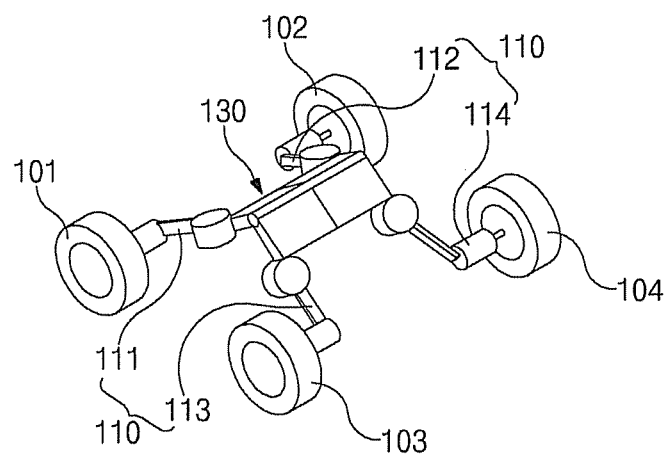
Figure 5:
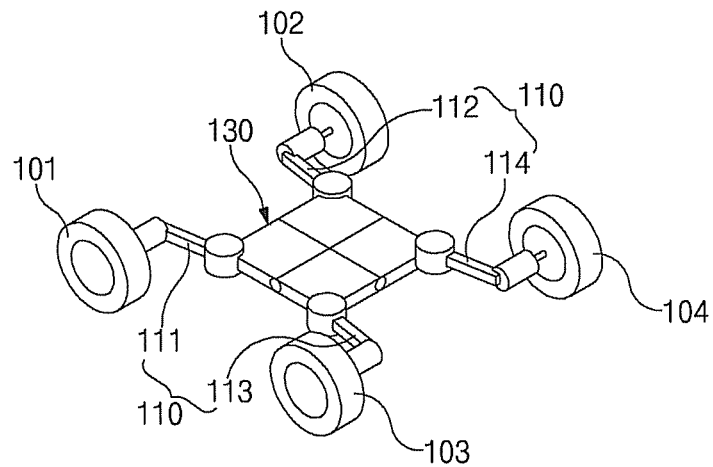
FIG. 5A is a view illustrating a width variable structure of a moving and transport means using mecanum wheels in a state before the width is changed in the horizontal direction according to an exemplary embodiment of the present invention.
FIG. 5B is a view illustrating a width variable structure of a moving and transport means using mecanum wheels in a state after the width is changed in the horizontal direction according to an exemplary embodiment of the present invention.
Figure 5:
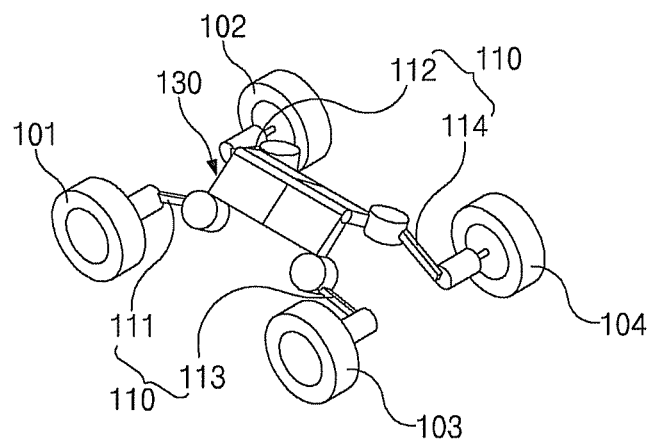

FIGS. 3 to 5B show a width variable structure of a moving and transport means, e.g., such as a vehicle, equipped with mecanum wheels according to an exemplary embodiment of the present invention. FIG. 3 is a cross-sectional view illustrating a width variable structure of a moving and transport means using mecanum wheels according to an exemplary embodiment of the present invention, FIGS. 4A and 4B are views illustrating a width change state in the vertical direction in a width variable structure of a moving and transport means using mecanum wheels according to an exemplary embodiment of the present invention, and FIGS. 5A and 5B are views illustrating a width change state in the horizontal direction in a width variable structure of a moving and transport means using mecanum wheels according to an exemplary embodiment of the present invention.

As illustrated in FIGS. 3 to 5B, a width variable structure of a moving and transport means using mecanum wheels according to an exemplary embodiment of the present invention includes mecanum wheels 100 interlocking with motors 120, and a plurality of links 110 connecting the mecanum wheels 100. The width of the moving and transport means in the horizontal and vertical directions can be adjusted using the driving forces of the mecanum wheels 100 to improve the merchantability and cost of production of the moving and transport means.

Hereinafter, constituent elements of a width variable structure of a moving and transport means using mecanum wheels according to an exemplary embodiment of the present invention will be described one by one with reference to the accompanying drawings.

First, as illustrated in FIG. 3, the width variable structure of a moving and transport means, e.g., a vehicle, using mecanum wheels according to an embodiment of the present invention includes the plurality of mecanum wheels 100, the links 110 connecting the mecanum wheels 100, and the motors 120 mounted on the mecanum wheels 100, respectively. The mecanum wheels 100 are mounted on lower portions of the moving and transport means to make it possible to move the moving and transport means in the forward and backward directions, in the left and right directions, and in the left and right diagonal directions. The mecanum wheels 100 also make it possible to rotate the moving and transport means clockwise or counterclockwise.

Here, the mecanum wheels 100 can move the moving and transport means in various directions through the plurality of rollers that form the mecanum wheels 100. Since the driving principle of the mecanum wheels 100 has been described in the related art, further explanation thereof will be omitted.

Figure 1:
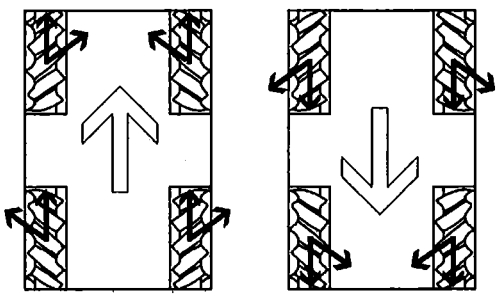
FIGS. 1A to 1E are views illustrating the driving principle of mecanum wheels which can move a moving and transport means in the related art.
Figure 1:
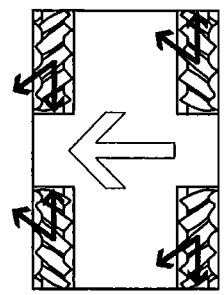
Figure 1:
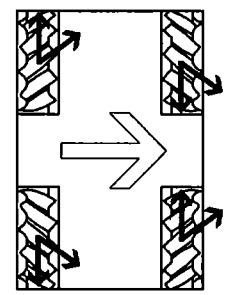
Figure 1:
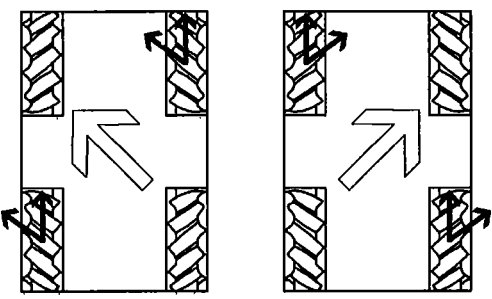
Figure 1:
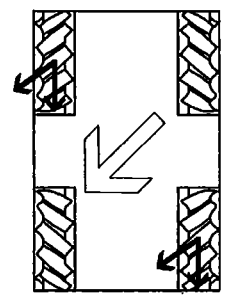
Figure 1:
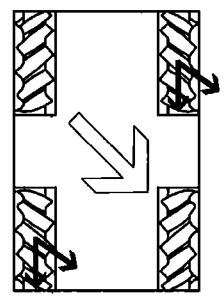
Figure 1:
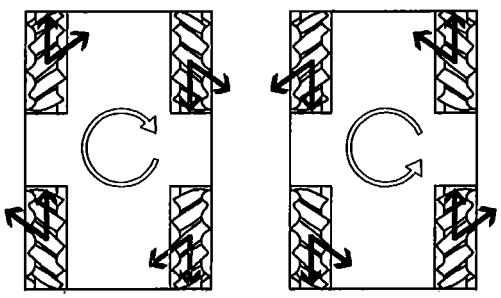
Figure 2:
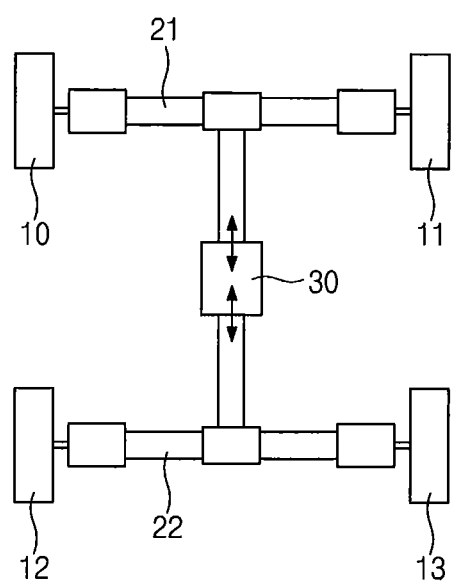
FIG. 2 is a cross-sectional view illustrating a width variable structure in the vertical direction of a moving and transport means using mecanum wheels in the related art.

On the other hand, the mecanum wheels 100 include a first mecanum wheel 101 positioned on a front left side, a second mecanum wheel 102 positioned on a front right side, a third mecanum wheel 103 positioned on a rear left side, and a fourth mecanum wheel 104 positioned on a rear right side, and as illustrated in FIG. 1, the moving and transport means can move in the forward and backward directions, in the left and right directions, and in the left and right diagonal directions, or can be rotated clockwise or counterclockwise.

The motors 120 are mounted on the mecanum wheels 100, and transfer the driving forces generated by the mecanum wheels 100 to the links 110. In this case, it is preferable that the motors 120 include a first motor 121 mounted on the first mecanum wheel 101, a second motor 122 mounted on the second mecanum wheel 102, a third motor 123 mounted on the third mecanum wheel 103, and a fourth motor 124 mounted on the fourth mecanum wheel 104, and the driving forces generated from the respective mecanum wheels 100 are transferred to the links 110.

Preferably, the links 110 include a first link 111 connected to the first motor 121, a second link 112 connected to the second motor 122, a third link 113 connected to the third motor 123, and a fourth link 114 connected to the fourth motor 124. The driving forces generated from the respective mecanum wheels 100 are transferred to the links 110 through the respective motors 120.

A linkage 130 for connecting the first link 111, the second link 112, the third link 113, and the fourth link 114 is additionally provided. The linkage 130 and the respective links 110 can be folded in the horizontal or vertical direction by the driving forces transferred through the respective links 110, and thus the width of the moving and transport means in the left and right directions or in the forward and backward directions can be varied.

In this case, it is preferable that the linkage 130 is connected to the first link 111, the second link 112, the third link 113, and the fourth link 114 in a folding structure to be folded, and thus the width of the moving and transport means in the horizontal or vertical direction can be varied.

As illustrated in FIG. 3, the first mecanum wheel 101 that includes the first motor 121 is provided on the front left side, the second mecanum wheel 102 that includes the second motor 122 is provided on the front right side, the third mecanum wheel 103 that includes the third motor 123 is provided on the rear left side, and the fourth mecanum wheel 104 that includes the fourth motor 124 is provided on the rear right side. The first motor 121 that interlocks with the first mecanum wheel 101 is connected to the first link 111, the second motor 122 that interlocks with the second mecanum wheel 102 is connected to the second link 112, the third motor 123 that interlocks with the third mecanum wheel 103 is connected to the third link 113, and the fourth motor 124 that interlocks with the fourth mecanum wheel 104 is connected to the fourth link 114. The first link 111, the second link 112, the third link 113, and the fourth link 114 are mutually connected through the linkage 130.

As a result, the driving forces generated from the plurality of mecanum wheels 100 mounted on the lower portions of the moving and transport means are transferred to the linkage 130 that connects the links 110 through the respective motors 120. Accordingly, folding in the forward and backward directions may be performed between the linkage 130 and the respective links 110 as illustrated in FIG. 4 or in the left and right directions as illustrated in FIG. 5. Accordingly, the linkage 130 and the links 110 may be folded in either the horizontal or vertical direction, and the width in the left and right directions or the width in the forward and backward directions of the mecanum wheels 100 mounted on the moving and transport means can be varied accordingly.

As described above, the width variable structure of a moving and transport means using mecanum wheels includes a plurality of mecanum wheels, a plurality of links connecting the mecanum wheels, and motors mounted on the mecanum wheels to transfer driving forces to the links, respectively, and since the width of the moving and transport means in the horizontal and vertical directions is adjusted using the driving forces of the mecanum wheels, the components such as actuators may be omitted. Thus, the manufacturing costs can be reduced and the merchantability and effectiveness of the product can be improved through structural simplification.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A width variable structure of a moving and transport means using mecanum wheels, comprising:
   a plurality of mecanum wheels;
   a plurality of links connecting the mecanum wheels; and
   a plurality of motors wherein at least one motor is mounted on each of the mecanum wheels and is operably connected to at least one link of the plurality of links to transfer driving forces to the links, respectively and then to the mecanum wheels,
   wherein the plurality of mecanum wheels includes:
      a first mecanum wheel positioned on a front left side of the width variable structure;
      a second mecanum wheel positioned on a front right side of the width variable structure;
      a third mecanum wheel positioned on a rear left side of the width variable structure; and
      a fourth mecanum wheel positioned on a rear right side of the width variable structure, and
   wherein the plurality of motors include:
      a first motor mounted on the first mecanum wheel, the first motor transferring power through one or more of the plurality of links to the first mecanum wheel;
      a second motor mounted on the second mecanum wheel, the second motor transferring power through one or more of the plurality of links to the second mecanum wheel;
      a third motor mounted on the third mecanum wheel, the third motor transferring power through one or more of the plurality of links to the third mecanum wheel; and
      a fourth motor mounted on the fourth mecanum wheel, the fourth motor transferring power through one or more of the plurality of links to the fourth mecanum wheel, and
   wherein the plurality of links include:
      a first link connected to the first motor;
      a second link connected to the second motor;
      a third link connected to the third motor; and
      a fourth link connected to the fourth motor,
         wherein the first, second, third and fourth links all connect to the linkage to transfer to the linkage force from one or more of the mecanum wheels to fold the linkage based upon which of the one or more mecanum wheels are moving.

2. The width variable structure according to claim 1, wherein the linkage is foldably connected to the first link, the second link, the third link, and the fourth link.

3. The width variable structure according to claim 2, wherein the linkage is configured to be folded in a first direction to vary a horizontal width of the width variable structure and is configured to fold in a second direction to vary a vertical width of the width variable structure.

4. A vehicle using mecanum wheels, comprising:
   a plurality of mecanum wheels;
   a plurality of links connecting the mecanum wheels; and
   a plurality of motors wherein at least one motor is mounted on each of the mecanum wheels and is operably connected to at least one link of the plurality of links to transfer driving forces to the links, respectively and then to the mecanum wheels,
   wherein the plurality of mecanum wheels includes:
      a first mecanum wheel positioned on a front left side of the vehicle;
      a second mecanum wheel positioned on a front right side of the vehicle;
      a third mecanum wheel positioned on a rear left side of the vehicle; and
      a fourth mecanum wheel positioned on a rear right side of the vehicle, and
   wherein the plurality of motors include:
      a first motor mounted on the first mecanum wheel, the first motor transferring power through one or more of the plurality of links to the first mecanum wheel;
      a second motor mounted on the second mecanum wheel, the second motor transferring power through one or more of the plurality of links to the second mecanum wheel;
      a third motor mounted on the third mecanum wheel, the third motor transferring power through one or more of the plurality of links to the third mecanum wheel; and
      a fourth motor mounted on the fourth mecanum wheel, the fourth motor transferring power through one or more of the plurality of links to the fourth mecanum wheel, and
   wherein the plurality of links include:
      a first link connected to the first motor;
      a second link connected to the second motor;
      a third link connected to the third motor; and
      a fourth link connected to the fourth motor.
         wherein the first, second, third and fourth links all connect to the linkage to transfer to the linkage force from one or more of the mecanum wheels to fold the linkage based upon which of the one or more mecanum wheels are moving.

5. The vehicle according to claim 4, wherein the linkage is foldably connected to the first link, the second link, the third link, and the fourth link.

6. The vehicle according to claim 5, wherein the linkage is configured to be folded in a first direction to vary a horizontal width of the vehicle and is configured to fold in a second direction to vary a vertical width of the vehicle.

* * * * *